US009751105B2

(12) United States Patent
Dellea et al.

(10) Patent No.: US 9,751,105 B2
(45) Date of Patent: Sep. 5, 2017

(54) FACILITY AND METHOD FOR DEPOSITING A WIDTH ADJUSTABLE FILM OF ORDERED PARTICLES ONTO A MOVING SUBSTRATE

(75) Inventors: Olivier Dellea, La Talaudiere (FR); Philippe Coronel, Barraux (FR); Pascal Fugier, Bernin (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 653 days.

(21) Appl. No.: 14/131,082

(22) PCT Filed: Jul. 10, 2012

(86) PCT No.: PCT/EP2012/063466

§ 371 (c)(1),
(2), (4) Date: Jan. 6, 2014

(87) PCT Pub. No.: WO2013/007719

PCT Pub. Date: Jan. 17, 2013

(65) Prior Publication Data

US 2014/0147583 A1 May 29, 2014

(30) Foreign Application Priority Data

Jul. 13, 2011 (FR) ..................................... 11 56430

(51) Int. Cl.
*B05C 19/04* (2006.01)
*B05D 1/12* (2006.01)
(Continued)

(52) U.S. Cl.
CPC .......... *B05C 19/04* (2013.01); *B05C 11/1002* (2013.01); *B05C 11/1036* (2013.01);
(Continued)

(58) Field of Classification Search
CPC ... B05C 11/1002; B05C 19/00; B05C 19/008; B05C 19/04
(Continued)

(56) References Cited

U.S. PATENT DOCUMENTS 5,512,326 A * 4/1996 Albrecht ................ B05D 1/206 118/402
5,851,289 A * 12/1998 Sato ...................... B05C 5/0254 118/411
(Continued)

FOREIGN PATENT DOCUMENTS

CA 2 695 449 2/2008
CA WO 2008014604 A1 * 2/2008 ............... B05C 9/02
(Continued)

OTHER PUBLICATIONS

U.S. Appl. No. 14/398,340, filed Oct. 31, 2014, Savelli, et al.
(Continued)

*Primary Examiner* — Alexander Weddle
(74) *Attorney, Agent, or Firm* — Oblon, McClelland, Maier & Neustadt, L.L.P.

(57) ABSTRACT

A facility for depositing a film of ordered particles onto a moving substrate, the facility configured to allow deposition, onto the substrate, of a film of ordered particles escaping from a particle outlet of a transfer zone having a first width. The facility further includes an accessory device in a form of a deposit head, provided to seal the particle outlet and configured to allow the deposition, onto the substrate, of a film of ordered particles escaping from an end of a particle transfer channel of the deposit head, the end having a second width strictly lower than the first width.

10 Claims, 8 Drawing Sheets

(51) Int. Cl.

| | |
|---|---|
| ***B05C 19/00*** | (2006.01) |
| ***B05D 1/20*** | (2006.01) |
| ***B05C 11/10*** | (2006.01) |
| ***B05C 19/06*** | (2006.01) |
| *B05D 3/06* | (2006.01) |
| *B05D 3/00* | (2006.01) |
| *B05D 3/12* | (2006.01) |

(52) U.S. Cl.

CPC ............ *B05C 19/00* (2013.01); *B05C 19/008* (2013.01); *B05C 19/06* (2013.01); *B05D 1/12* (2013.01); *B05D 1/20* (2013.01); *B05D 3/061* (2013.01); *B05D 3/12* (2013.01); *B05D 3/203* (2013.01)

(58) Field of Classification Search

USPC .......................................................... 118/308

See application file for complete search history.

(56) References Cited

U.S. PATENT DOCUMENTS

| | | | |
|---|---|---|---|
| 5,965,209 A | 10/1999 | Komatsu et al. | |
| 7,804,134 B2 | 9/2010 | Coronel et al. | |
| 2005/0129867 A1* | 6/2005 | Picard .................. | B01D 69/122 427/434.3 |
| 2006/0255182 A1 | 11/2006 | Okumura et al. | |
| 2011/0135834 A1 | 6/2011 | Schneider et al. | |
| 2013/0052552 A1 | 2/2013 | Phan et al. | |
| 2013/0330471 A1 | 12/2013 | Dellea et al. | |

FOREIGN PATENT DOCUMENTS

| | | |
|---|---|---|
| EP | 0 654 306 | 5/1995 |
| EP | 654306 A1 * | 5/1995 |

OTHER PUBLICATIONS

U.S. Appl. No. 14/423,957, filed Feb. 25, 2015, Dellea, et al.

International Search Report Issued Nov. 16, 2012 in PCT/EP12/063466 Filed Jul. 10, 2012.

U.S. Appl. No. 14/369,752, filed Jun. 30, 2014, Dellea, et al.

U.S. Appl. No. 14/375,858, filed Jul. 31, 2014, Dellea, et al.

U.S. Appl. No. 14/375,994, filed Jul. 31, 2014, Dellea, et al.

U.S. Appl. No. 14/375,532, filed Jul. 30, 2014, Dellea, et al.

* cited by examiner

FACILITY AND METHOD FOR DEPOSITING A WIDTH ADJUSTABLE FILM OF ORDERED PARTICLES ONTO A MOVING SUBSTRATE

TECHNICAL FIELD

The invention relates to the field of facilities and methods for depositing a film of ordered particles, onto a moving substrate.

More precisely, it relates to the deposition of a film of ordered particles, preferably of the single layer type, the particle size of which can be between a few manometers and a few hundreds micrometers. The particles, having preferably a spherical shape, can be for example particles of silica, or polymer such as polystyrene.

The invention has many applications, in particular in the field of fuel cells, optics, photonics, polymer coating, chips, MEMs, surface patterning for organic electronics and photovoltaics, etc.

STATE OF PRIOR ART

From prior art, there are known such methods and facilities aiming at depositing a film of ordered particles onto a moving substrate, wherein the latter can be flexible or rigid.

Generally, it is provided a transfer zone supplied with particles, which float in a carrier liquid contained in the same transfer zone. The ordered particles in the transfer zone, forming a single layer of particles called a low thickness film, are pushed by the arrival of other particles as well as the circulation of the carrier liquid, to an outlet from this zone by which they reach the moving substrate on which they are deposited. To do this, a capillary bridge usually connects the substrate and the carrier liquid contained in the transfer zone.

In regular operating regimen of the facility, in the transfer zone, the particles are held ordered by virtue in particular of the pressure exerted upstream by the moving particles which are intended to subsequently join this transfer zone. The particle ordering cohesion is further ensured by capillary or electrostatic type low forces. By way of example only, when the particle transfer zone is connected upstream to a tilted ramp on which move the particles coming from a dispensing device, these are the same particles present on the tilted ramp which exert a pressure onto the particles contained in the transfer zone, and which thus allow, in cooperation with the proximity capillary forces, to preserve the ordering of the particles in this zone, until the deposition onto the substrate, through capillarity or direct contact.

Still in the same exemplary configuration integrating the tilted ramp, it is the kinetic energy associated with the particles moving on the ramp which enables the same to be automatically ordered in this same ramp, when they impact the particle front, which is also located on the tilted ramp. The ordering is thus set on the ramp, and then preserved when the ordered particles penetrate the transfer zone, by virtue of the continuous supply of particles impacting the front.

The kinetic energy required for ordering the particles is herein brought by the tilted ramp transporting the carrier liquid and the particles. Other solutions are however possible, such as moving, using a pump, the carrier liquid on an horizontal plane the downstream part of which makes up the particle transfer zone. Another solution consists in replacing said pump by a blower enabling an air flow to be applied to the surface of the carrier liquid on which the particles float.

In all these embodiments of prior art, the film deposited onto the substrate has a determined width, corresponding to the full width of the outlet from the transfer zone by which the particles escape. Depositions of films having different widths are only contemplated through distinct facilities, having suitable dimensions. This generates drawbacks in terms of bulk, manufacturing costs and facility engineering costs. By way of example, the careful determination of the particle face position on the tilted ramp is a function of a multitude of parameters, some of which are specific to the facility in question. This implies determining the front position for each facility of different designs.

DISCLOSURE OF THE INVENTION

The object of the invention is thus to circumvent at least partially the abovementioned drawbacks, relating to embodiments of prior art.

To do this, one object of the invention is to provide a facility for depositing a film of ordered particles onto a substrate, preferably a moving one, the facility comprising:

a transfer zone comprising a particle inlet and a particle outlet spaced apart from each other by two side rims facing each other, holding a carrier liquid on which the particles float, said facility being designed to allow a deposition, onto the substrate, of a film of ordered particles escaping from said particle outlet having a first width (L1), the deposition being for example performed by contact or using a capillary bridge connecting the carrier liquid contained in the transfer zone and said substrate on which the film of ordered particles is intended to be deposited.

According to the invention, the facility further includes an accessory device in the form of a deposit head, provided to seal said particle outlet and designed to allow the deposition, onto the substrate, of a film of ordered particles escaping from an end of a particle transfer channel of this deposit head, said end having a second width (L2) strictly lower than said first width (L1)

The invention also provides, cleverly, an accessory device mountable to the facility so as to achieve the deposition of a film having a lower width. This solution thus gives a satisfactory response to bulk, manufacturing cost and engineering cost problems met in embodiments of prior art. By way of indicative example, the front position can be preserved, whether the facility is equipped with the accessory device or not.

Advantageously, several accessory devices are provided in association with a same facility, each of these devices enabling a different film width to be achieved. It is also possible to provide that a same accessory device has a plurality of particle transfer channels, in order to simultaneously deposit several films onto a same substrate, wherein these films can then of course have identical or different widths. An analogous solution with single channel or multichannel heads is also contemplatable, without departing from the scope of the invention. Moreover, for each these embodiments, the second width can possibly be adjustable.

The facility according to the invention is remarkable in that it enables to have a common base for a multitude of depositions having different shapes, only the deposition head forming accessory device being suitable for the desired film size, or even removed when the deposition must have a maximum width corresponding to the first particle outlet width from the transfer zone.

Preferably, the facility also includes one or more suction nozzles able to attract the ordered particles present in the transfer zone to the particle transfer channel of said deposition head, when the latter is mounted to the facility. The suction created enables the introduction, into the transfer channel, of particles initially present in the transfer zone to be promoted. This suction is preferentially performed at the liquid/air interface in the particle transfer channel.

Preferably, said one or more suction nozzles are arranged in the particle transfer channel, in the proximity of said end.

Preferably, the facility also includes means enabling the particles to be acted upon, before they enter into the transfer channel and/or within the latter. These means preferentially enable the orientation of the particle and/or on the physico-chemical properties thereof to be acted upon. To do this, these means can be of the laser, magnetic, electric, thermal, ultrasonic type, or any other famous design deemed appropriate by those skilled in the art.

Preferably, the bottom of said transfer channel has a coating of hydrophilic material, interrupted before said end, which is made of hydrophobic material. The coating of hydrophilic material promotes the advance and withdrawal of the carrier liquid within the transfer channel. The bottom of the part of the deposit head located upstream of the transfer channel can also be provided with such a coating. The hydrophobic character of the channel end intended to cooperate with the substrate enables in turn the contact between the liquid and the substrate to be efficiently cut off during a discharge operation of the carrier liquid out from the deposit head, at the end of the step of depositing a film onto this substrate.

Preferably, the ratio between the first and second widths (L1, L2) is between 2000 and 2, and preferably between 100 and 10.

Preferably, the facility comprises a tilted ramp for circulating the particles, attached to said inlet of the transfer zone, and whereon said carrier liquid (16) is also intended to circulate.

The kinetic energy required for ordering the particles in regular regimen is herein brought by the tilted ramp transporting the carrier liquid and the particles. Other solutions are however possible, such as moving, using a pump, the carrier liquid on a horizontal plane the downstream part of which makes up the particle transfer zone. Another solution consists in replacing the pump by a blower enabling an air flow to be applied to the surface of the carrier liquid, on which the particles float. Other solutions are however contemplatable, without departing from the scope of the invention, such as a compression work of the particles via a so-called "Langmuir-Blodgett" technique.

Preferably, said accessory device in the form of a deposit head is designed to enable the deposition, onto the substrate of a film of ordered particles escaping from the end of the particle transfer channel, using a direct contact provided between the end of the deposit head and the substrate. Alternatively, a capillary bridge connecting the carrier liquid contained in the particle transfer channel and said substrate on which the film of ordered particles is intended to be deposited can be provided.

Finally, an object of the invention is also to provide a method for depositing a film of ordered particles onto a substrate, preferably a moving one, using a facility such as above described. In this method, depending on the desired width for the film of particles, said accessory device in the form of a deposit head is mounted or not to said facility, prior to said deposition.

Further advantages and characteristics of the invention will appear in the detailed non-limiting description herein below.

BRIEF DESCRIPTION OF THE DRAWINGS

This description will be made with regard to the appended drawings wherein.

DETAILED DISCLOSURE OF PREFERRED EMBODIMENTS

Figure 1:
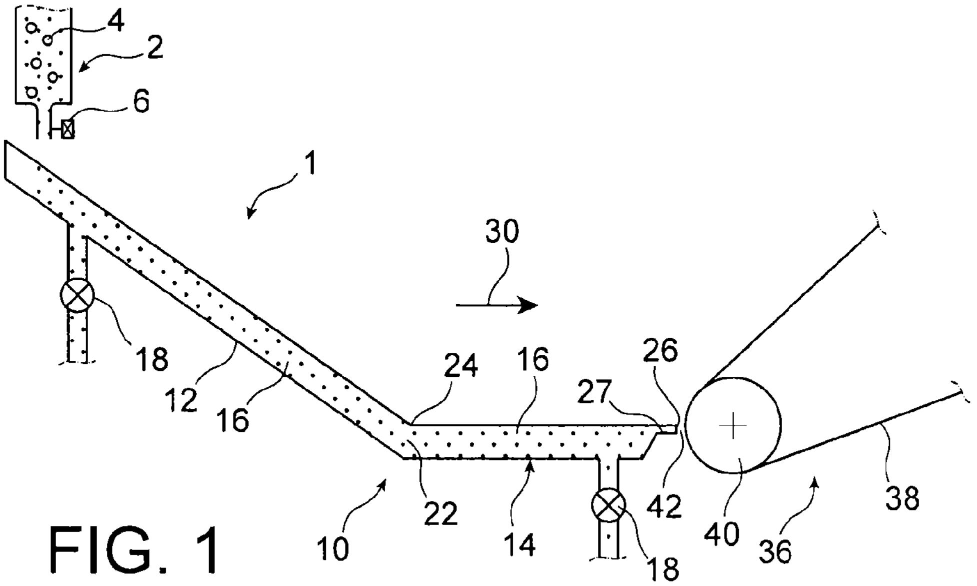
FIG. 1 shows a depositing facility according to a preferred embodiment of the present invention, in schematic cross-section view taken along the line I-I of FIG. 2, the facility represented being in a first configuration.
Figure 2:
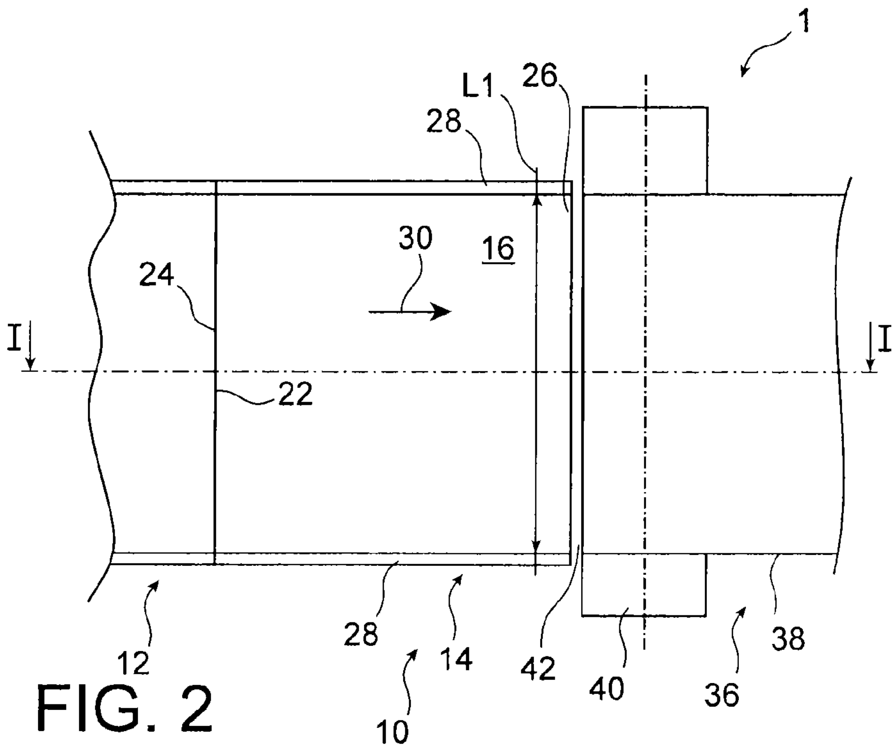
FIG. 2 represents a schematic top view of the depositing facility shown in FIG. 1.

In reference first to FIGS. 1 and 2, a facility 1 for depositing a film of ordered particles on a moving substrate can be seen. The facility is shown according to a first configuration, wherein it is not equipped with its deposit head forming accessory device, specific to the present invention and which will be described hereinafter.

The facility 1 includes a device 2 for dispensing particles 4, the size of which is between a few manometers and a few hundred micrometers. The particles, having preferably a spherical shape, can be for example silica particles. Other particles of interest can be made of metal or metal oxide such as platinum, $TiO_2$, polymer such as polystyrene or PMMA, carbon, etc.

More precisely, in the preferred embodiment, the particles are silica spheres about 1 μm in diameter, stored in solution in the dispensing device 2. The proportion of the medium is about 7 g particles for 200 ml solution, herein butanol. Naturally, for the sake of clarity, the particles represented on figures assume a diameter higher than their actual diameter.

The dispensing device 2 has a controllable injection nozzle 6, of about 500 μm diameter.

The facility also includes a liquid conveyor 10, integrating a tilted ramp 12 for circulating particles, and a substantially horizontal transfer zone 14, or even having a slight tilt so as to promote the facility drainage, if need be. The top end of the tilted ramp is provided to receive the particles injected from the dispensing device 2. This ramp is straight, tilted by an angle between 5 and 60°, preferably between 10 and 30°, enabling the particles to be conveyed to the transfer zone 14. Furthermore, a carrier liquid 16 circulates on this ramp 12, up to inside the transfer zone. This liquid 16 can on the other hand be recirculated using one or two pumps 18, between the transfer zone 14 and the top end of the ramp. This is preferably deionized water, wherein the particles 4 can float. However, a new liquid via an open circulation system can be favoured.

The bottom end of the same ramp is connected to an inlet of the particle transfer zone 14. This inlet 22 is located at an inflection line 24 marking out the junction between the surface of the carrier liquid present on the tilted plane of the ramp 12, and the surface of the carrier liquid present on the horizontal part of the transfer zone 14.

The particle inlet 22 is spaced from a particle outlet 26 using two side rims 28 retaining the carrier liquid 16 in the zone 14. These rims 28, facing away from each other, extend parallel to a main flow direction of the carrier liquid and the particles in the facility, this direction being represented by the arrow 30 on FIGS. 1 and 2. The zone 14 has consequently the form of a corridor or a path open at its inlet and its outlet.

The bottom of the downstream part of the transfer zone has a platen 27 slightly tilted upstream with respect to the horizontal direction, for example by a value in the order of 5 to 10°. It is the downstream end of the same platen 27, also called "blade", which partly defines the particle outlet 26.

The facility 1 is also provided with a substrate conveyor 36, intended to move the substrate 38. This substrate can be rigid or flexible. In the latter case, it can be moved on a roll 40 the axis of which is parallel to the outlet 26 from the zone 14, in the proximity of which it is located. Indeed, the substrate 39 is intended to be moved very close to the outlet 26, so that the particles escaping from this outlet can be easily deposited onto the substrate, via a capillary bridge 42, also called meniscus, which connects it to the carrier liquid 16. Even more preferentially, the substrate can be directly in contact with the transfer zone, without departing from the scope of the invention. The abovementioned capillary bridge is therefore no longer required.

In the example shown in the figures, the width of the substrate corresponds to the width of the zone 14 and its outlet 16. It is a first width L1, which also corresponds to the width of the film of particles to be deposited onto the substrate. This first width can be in the order of 25 to 30 cm.

The capillary bridge 42 is ensured between the carrier liquid 16 which is located at the outlet 26, and a part of the substrate 38 taking the form of the guiding/driving roll 40. The rotation axis of this latter roll can be located in the plane of the upper surface of the carrier liquid retained in the zone 14.

Alternatively, in particular when the substrate 38 is solid, it can be moving along a vertical direction, substantially orthogonal to the direction 30.

A method of depositing a film of ordered particles will now be described in reference to FIGS. 3 to 6.

First, the injection nozzle 6 is activated to start dispensing the particles 4 onto the ramp 12. This is to implement an initial step of filling the transfer zone 14, by the particles 4, with the carrier liquid 16 already at the required level in the zone 14.

Figure 3:
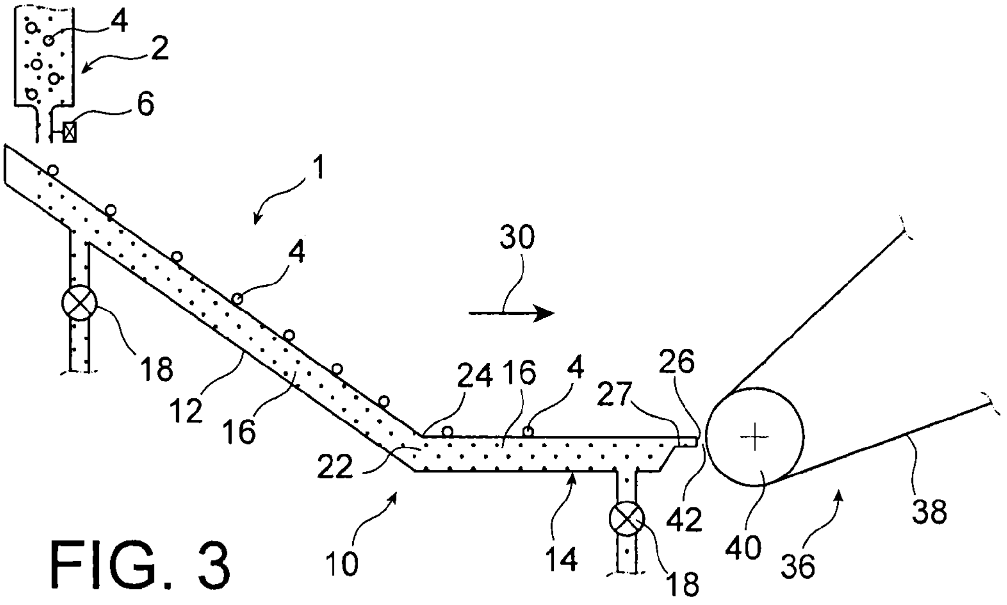
FIGS. 3 to 6 represent different steps of a depositing method implemented using the facility shown in the preceding figures.
Figure 4:
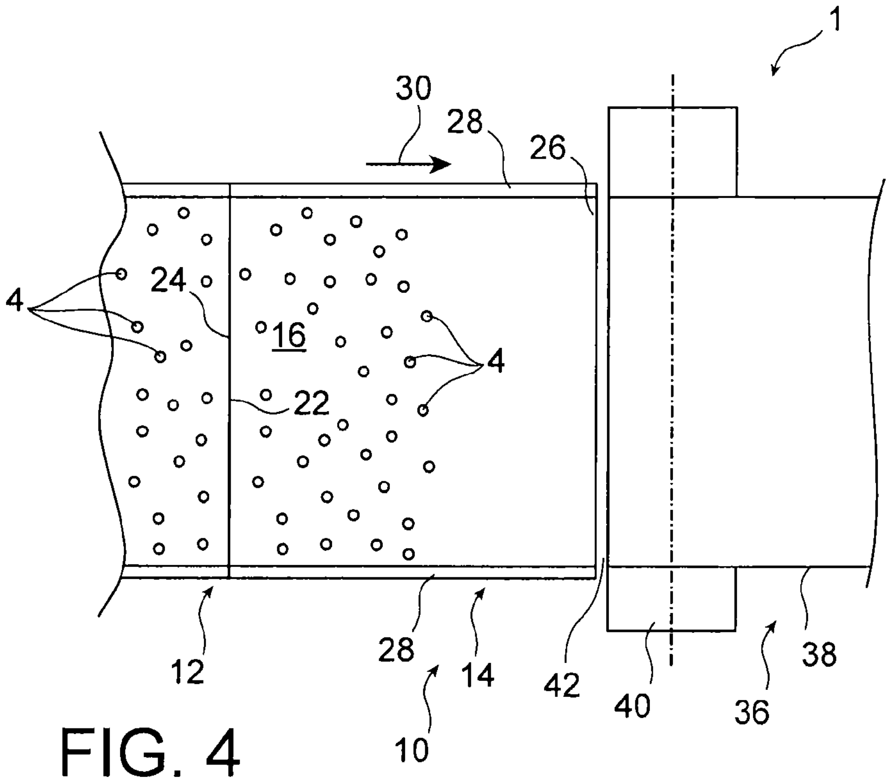

In this priming phase, the particles dispensed by the device 2 circulate on the ramp 12, and then penetrate the zone 14 wherein they are dispersed, as has been illustrated in FIGS. 3 and 4.

As the particles 4 are injected onto the ramp 12 and penetrate the transfer zone 14, they abut against the substrate 38, and then the upstream front of these particles tend to offset upstream, in the direction of the inflection line 24. The particle injection is continued even after this upstream front has passed the line 24, such that it rises on the tilted ramp 12.

Figure 5:
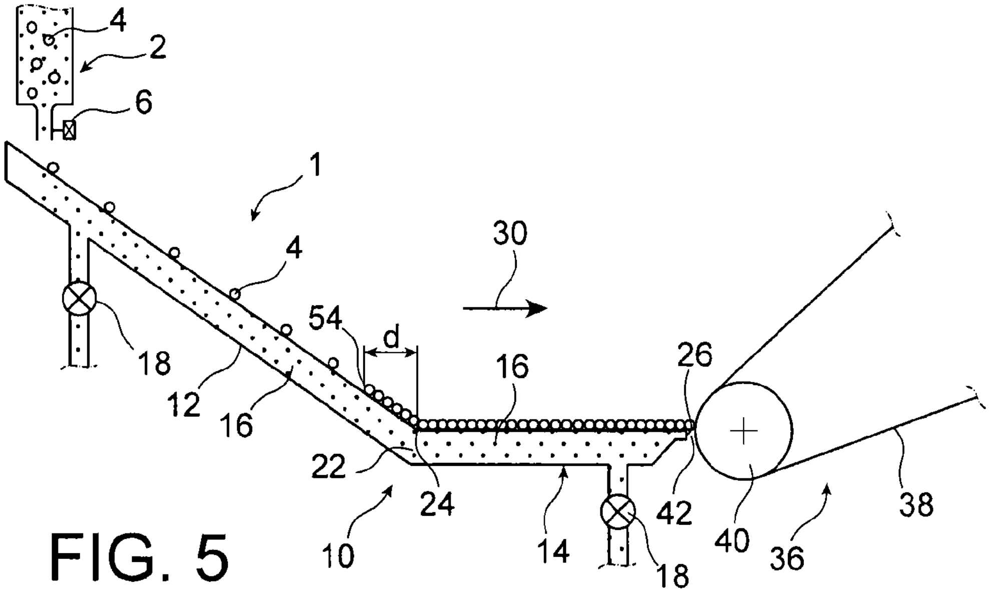

Actually, the upstream particle front 54 is such as to rise on the ramp 12 so as to be located at a given horizontal distance "d" of the inflection line 24, as shown in FIG. 5. The distance "d" can be in the order of 30 mm.

At this time, the particles 4 are ordered in the transfer zone and on the ramp 12, wherein they are automatically ordered, without assistance, thanks in particular to their kinetic energy taken to advantage while impacting the front 54. The ordering is such that the film obtained has a so-called "hexagonal compact" structure, wherein each particle 4 is surrounded and contacted by six other particles 4 in contact between each other, as has been represented in FIG. 6.

Figure 6:
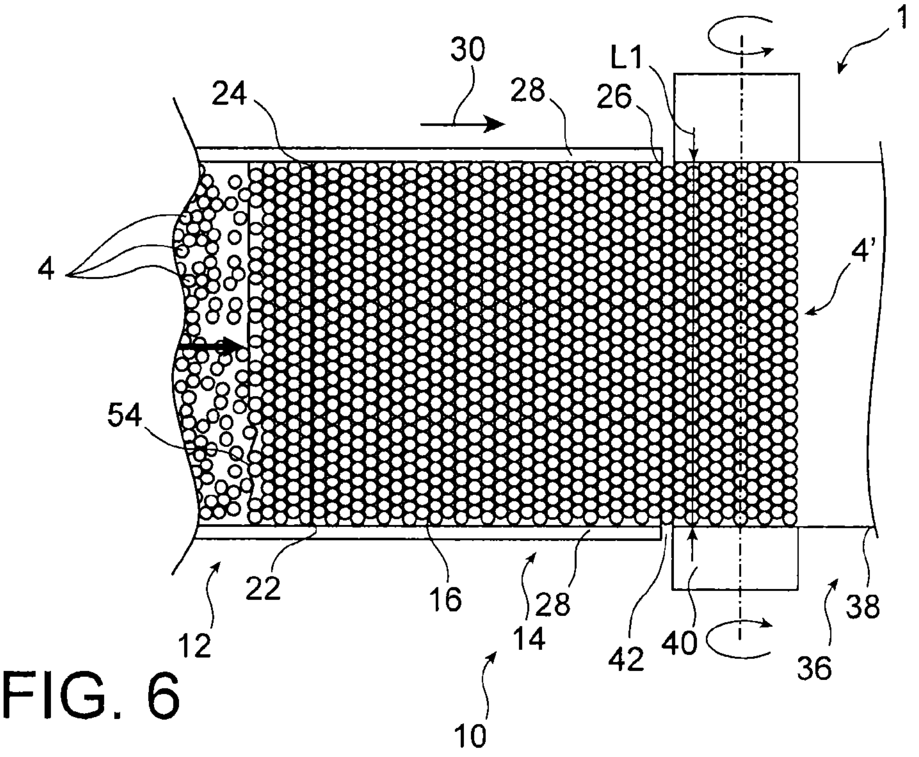

This FIG. 6 shows the facility condition after the movement of the substrate 38 has been triggered, initiated as soon as the front 54 has reached the required level represented in FIG. 5. The film of particles is then deposited onto this same substrate 38, by following the capillary bridge 42, in the manner described in Document CA 2 695 449. As discussed above, the width of this film 4' corresponds to the first width L1 of the outlet 26.

During the deposition, the particle injection and the substrate speed of movement are adjusted such that the particle front remains in a substantially identical position. To do this, the particle flow rate can be in the order of 0.1 ml/min to several ml/min, whereas the linear speed of the substrate 38, also called pulling speed, can be in the order of few mm/min to several hundred mm/min.

Figure 7:
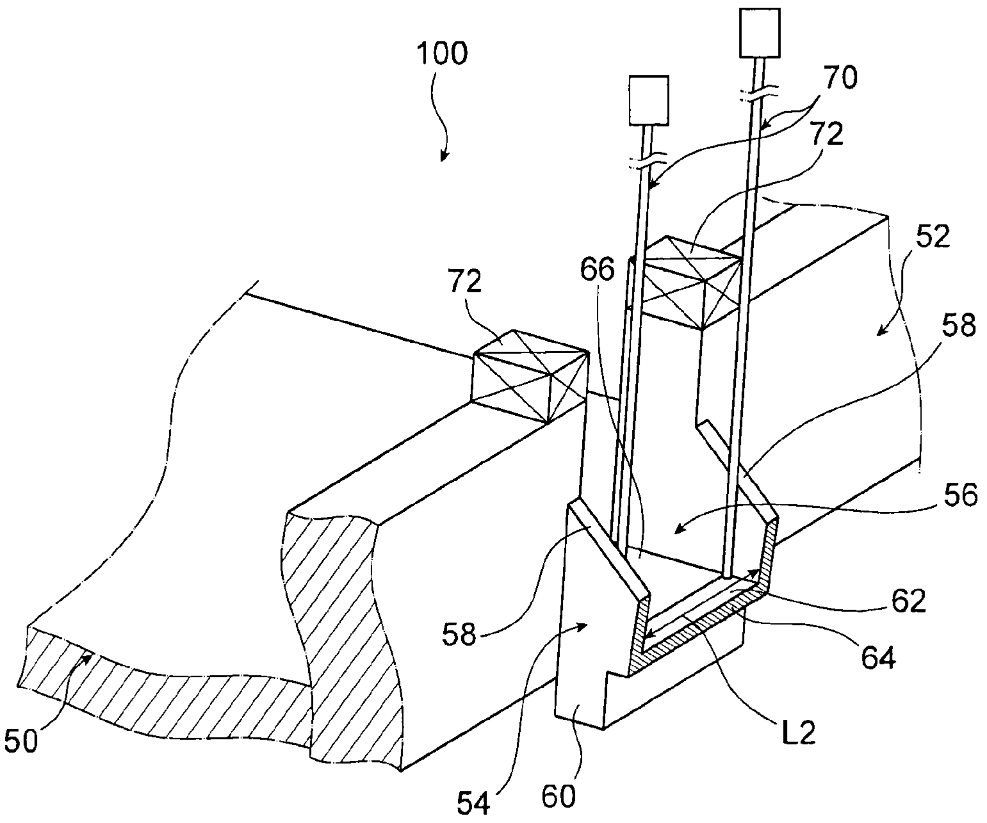
FIG. 7 represents a perspective view of a deposit head forming accessory device, intended to equip the facility shown in the previous figures.

When the facility must allow a film deposition on a width lower than the full width L1 of the particle outlet 25, an accessory device specific to the present invention, represented in FIG. 7, is used.

This accessory device 100 takes the form of a particle deposit head, intended to be mounted to the front end of the transfer zone 14, on the tilted platen 27. It actually comprises a planar platform 50, intended to bear against the platen 27 by taking its form. A vertical wall 52 extends from a front end of the platform 50. It has a through opening from which an offset structure 54 extends forwardly, these elements defining together a particle transfer channel 56 the bottom of which is in the front continuity of the platform 50. The length of this channel 56 is reduced at the most so as to facilitate the liquid circulation and particle flow.

The offset structure 54 has a bottom, two side flanks 58 corresponding to the edges of the channel 56, as well as a stop 60 extending downwardly to the platform 50, so as to be able to bear against the outlet 26 of the transfer zone and prevent the device 100 from sliding downwardly in this same zone 14.

The front end 62 of the transfer channel 56, having generally a U-shape cross-section, has a second width L2 lower than the first width L1, wherein a ratio between 100 and 10 can be retained. Here, it is the width L2 which conditions the width of the particle film which should be deposited, because the particles are intended to escape from this end 62 before reaching the substrate, with which it is preferentially in contact through a substantially vertical end edge 64. Generally, an edge 64 locally tangent to the substrate is aimed. This edge has a thickness as low as possible so as to restrict the liquid amount infiltrated in the interface with the facing substrate, and thus to restrict the liquid retention.

The platform 50 and the bottom of the transfer channel have a coating 66 of hydrophilic material, interrupted before the end 62, which in turn is made of a hydrophobic material, like preferentially the entire structure of the accessory device 100.

This hydrophobic material is preferentially Teflon (PTFE), selected for its hydrophobicity properties from which a surface tension of 73 $mN \cdot m^{-1}$ and a water contact angle of 112°, as well as for its mechanical properties such as its Young's modulus between 300 and 800 MPa, a Poisson's coefficient in the order of 0.46, and a friction coefficient of 0.05 to 0.2. Furthermore, its physicochemical properties are also interesting, in particular due to its insensitivity to usual solvents.

The advantages provided by these properties, for the operation of the facility, are numerous. First, the hydrophobicity of the vertical walls restricts the risk of depositing particles onto these walls, consisting of the vertical faces of the wall 52 and the flanks 58 of the transfer channel 56. Furthermore, the abovementioned mechanical properties enable a hardly rigid and relatively elastic material to be provided, allowing the deposit head to be contacted with the substrate without any risk of mutual damages. Finally, the physicochemical properties of Teflon imply that the device remains insensitive to most chemical products.

Moreover, the hydrophobicity of the channel end 62 enables the contact between the carrier liquid and the substrate to be efficiently cut off, during a discharge operation of the carrier liquid out of the deposit head, at the end of the step of depositing a film onto this substrate, as will be detailed hereinafter.

The accessory device is also equipped with two suction nozzles 70 able to attract the particles to the transfer channel 56. The suction is preferentially ensured at the end 62, at the liquid/air interface, in the proximity of the flanks 58 and the substrate, as has been schematically represented in FIG. 7. Each nozzle can have an internal diameter in the order of a few tens μm to a few mm.

Further, the device also includes means enabling the particles to be acted upon, before they enter into the transfer channel 56 and/or within the latter. These means 72, schematically represented in FIG. 7, preferentially enable the orientation, and possibly the ordering of the particles and/or the physicochemical properties thereof to be acted upon. To do this, these means can be of the laser, magnetic, thermal, ultrasonic or even electric type. By way of example, it is possible to orient Janus type spherical particles thanks to a laser beam, or even to orient Janus type sticks through the application of a magnetic field. Also, it is possible to promote the disappearance of possible inefficiencies in ordering the particles, via the application of ultrasounds to the carrier liquid. This enables the ordering to be improved, by virtue of stirring the particles in surface. The functionalization of the transfer head is thus also possible by virtue of the application of a normal external electric field to the surface of the carrier liquid. The application of a normal electric field enables the particles to be controllably spaced apart, and then arranged in a compact and organized manner when the electric field is gradually reduced. Alternatively, in the case of dielectric colloidal particles, having preferably a diameter between 10 nm and 10 μm, another method consists in using a laser beam to capture and move the particle. This means can be used to enhance the initial ordering.

A method of depositing a film of ordered particles will now be described in reference to FIGS. 8 to 14.

Figure 8:
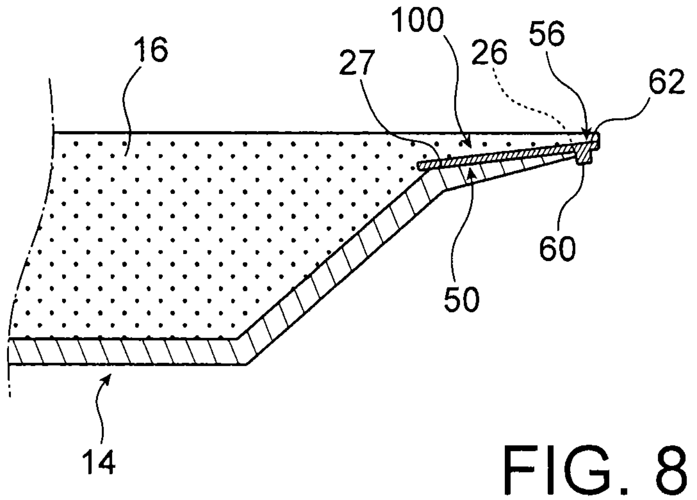
FIG. 8 shows the depositing facility being in a second configuration, this view being a schematic cross-section taken along the line VIII-VIII of FIG. 9.
Figure 9:
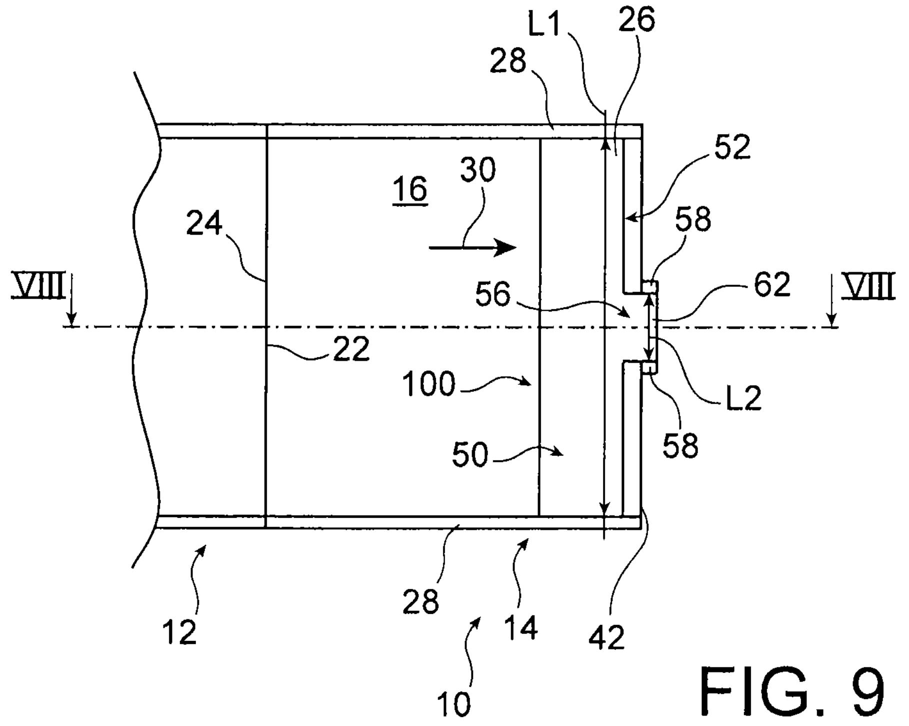
FIG. 9 represents a schematic top view of the depositing facility shown in FIG. 8.

In reference to FIGS. 8 and 9, the accessory device 100 is first placed at the downstream end of the transfer zone 14, with the platform 50 planarly pressing against the tilted platen 27, and with the stop 60 pressing against the free end of the same platen, in order to prohibit the device 100 from gliding downstream. In this position, the vertical wall 52 extends throughout the first width L1 of the particle outlet 26, so as to prohibit the same from passing elsewhere than through the transfer channel 56, of lower width L2.

Placing the device 100 is preferably performed in a dry condition, that is with the carrier liquid level low enough in the transfer zone not to wet the device 100 upon positioning. Only after the device 100 is positioned, the level of the carrier liquid 16 is increased, until it covers the end 62 of the channel 56, without passing the top end of the flanks 58.

The injection nozzle 6 is then activated to start dispensing the particles 4 onto the ramp 12. The aim is to implement a step of filling the transfer zone 14 and the deposit head 100, with the particles 4.

During this priming phase, the particles dispensed by the device 21 circulate on the ramp 12, and then penetrate the zone 14 wherein they are dispersed. Then, they arrive in the proximity of the wall 52 of the device 100 and penetrate the transfer channel 56. To assist initiating the introduction of these particles into the channel 56, the suction nozzles represented in FIG. 7 are activated, wherein the flow rate can be in the order of few ml/min to several hundreds ml/min. This suction is preferentially brief, for example exerted during half a second. It is preferentially initiated after the particles contact the wall 52, when the film is already well ordered.

Figure 10:
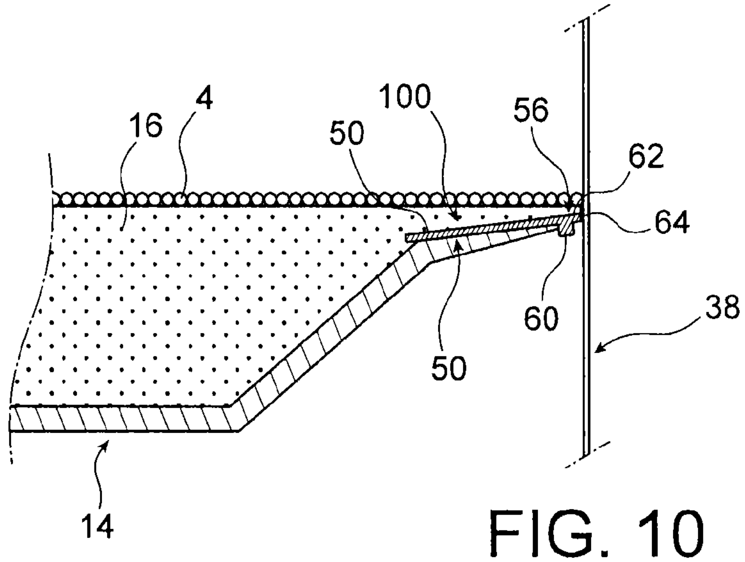
FIGS. 10 to 14 represent different steps of a depositing method implemented using the facility shown in FIGS. 8 to 14.
Figure 11:
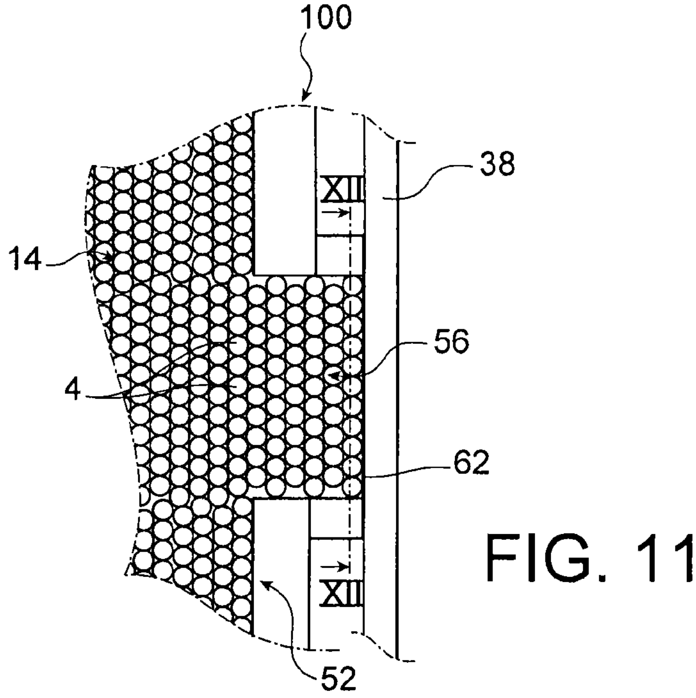

As the particles 4 are injected onto the ramp 12 and penetrate the transfer zone 14 and the channel 56, they abut against the wall 52 and the substrate 38, which is herein a rigid substrate, vertically arranged as has been represented in FIGS. 10 and 11. A capillary bridge can be created between the substrate 38 and the end 62 of the deposit head 100, or even, preferably, a contact is set between the same substrate 38 and the vertical edge 64 of the end 62. In the latter case, the contact pressure is preferably in the order of a few $N/mm^2$.

The upstream front of these particles then tends to offset upstream, in the direction of the inflection line 24 shown on the previous figures. The particle injection is continued even after this upstream front has passed the line 24, before it rises on the tilted ramp 12. As previously mentioned, the upstream front of particles 14 is such that it rises on the ramp 12 so as to be located at the given horizontal distance "d" of the inflection line 24, as shown in FIG. 5.

Figure 12:
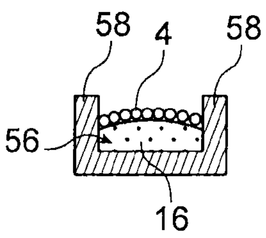

At this time, the particles 4 are ordered in the transfer channel 56, in the transfer zone 14 and the ramp 12, wherein these particles are automatically ordered, without assistance, by virtue in particular to their kinetic energy taken to advantage at the time of the impact onto the front 54. Moreover, as shown in FIG. 12, in the transfer channel 56, the particles 4 and the liquid 16 do not overflow from the side flanks 58, which ensures a subsequent high quality deposition.

Figure 13:
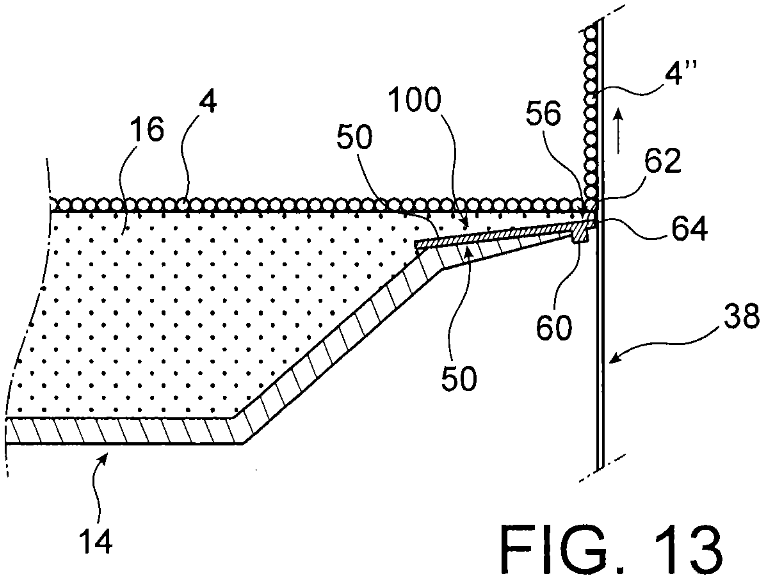
Figure 14:
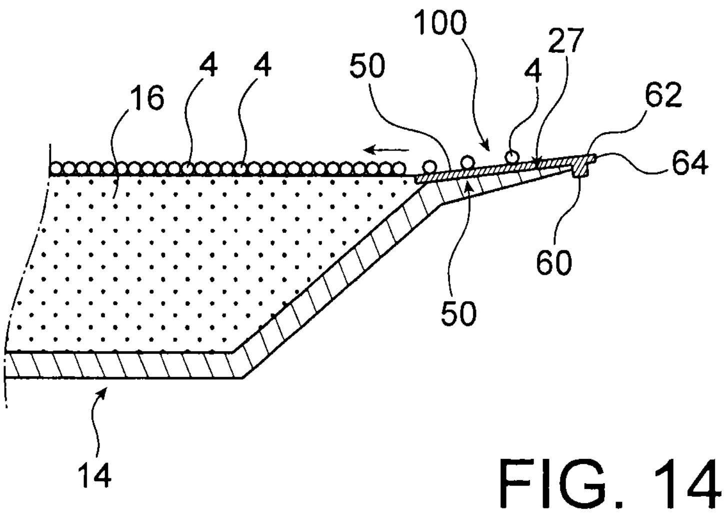

FIG. 13 shows the condition of the facility after the vertical movement of the substrate 38 is triggered, initiated as soon as the front 54 has reached the required level, analogous to that represented in FIG. 5. The particles 4 then are deposited on the same substrate 38, to obtain a film 4" having a lower width corresponding to the second width L2 of the end 62.

When the deposition must be stopped, the particle injection is interrupted, and the carrier liquid level must be lowered such that the liquid does not contact the substrate any longer. The device 100 can then be dried before being removed from the facility, according to any means deemed appropriate by those skilled in the art, these means may be of the conduction, convection, radiation type, etc.

On the other hand, due to the hydrophobicity of the end 62 of the device, the contact cut off between the carrier liquid and the substrate is efficiently operated upon lowering the level of this liquid.

For resuming a deposition with the accessory device 100, all the abovementioned steps are reiterated.

Figure 15:
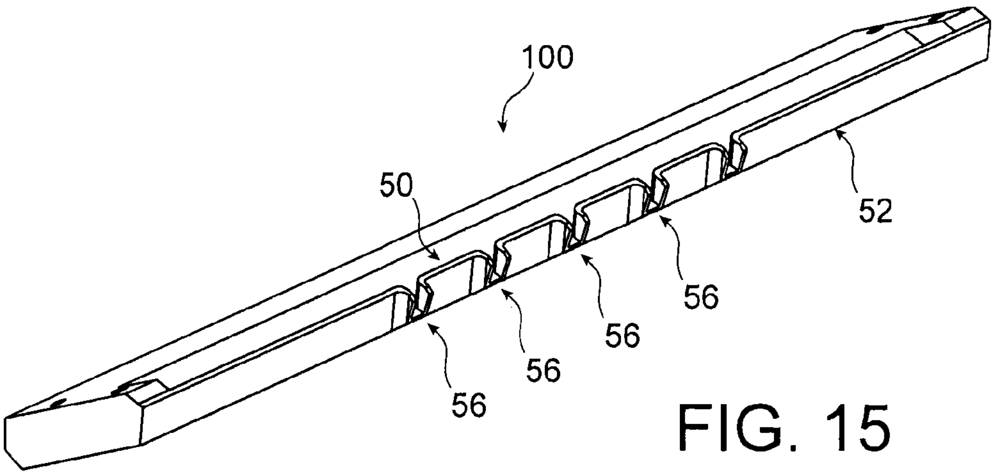
FIGS. 15 and 16 show perspective views of a deposit head forming accessory device, according to an alternative embodiment.
Figure 16:
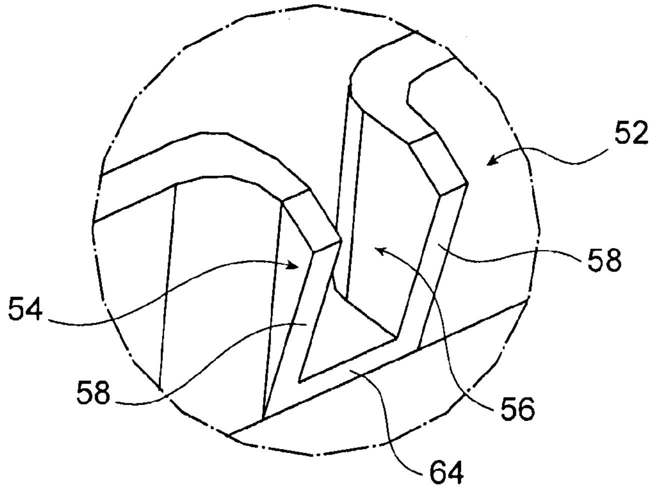

Naturally, the facility 1 can comprise several accessory devices of the type just described, each dedicated to depositing one or more films of particles having determined width(s). In this respect, FIGS. 15 and 16 show an accessory device 100 according to an alternative embodiment, wherein several channels 56 are provided, spaced from each other along the width direction, so as to be able to deposit simultaneously several films.

Of course, various modifications could be provided by those skilled in the art to the invention just described, only by way of non-limiting examples.

The invention claimed is:

1. A facility for depositing a film of ordered particles onto a substrate, or a moving substrate, the facility comprising:

a transfer zone including 1) a particle inlet, 2) a particle outlet spaced apart from the particle outlet, and 3) two side rims facing each other, said two side rims retaining a carrier liquid on which the ordered particles float, said particle outlet having a first width;

an accessory device in a form of a deposit head, having 1) a planar platform connected to the particle outlet of the transfer zone and 2) side flanks extending from the platform, said platform and the side flanks forming a particle transfer channel of the deposit head; and said accessory device configured to allow deposition, onto the substrate, of a film of the ordered particles escaping from an end of the particle transfer channel of the deposit head, the end of the particle transfer channel of the deposit head having a second width smaller than the first width of the particle outlet of the transfer zone.

2. The facility according to claim 1, further comprising one or more suction nozzles configured to attract the ordered particles present in the transfer zone, to the particle transfer channel of the deposit head, when the deposit head is mounted to the facility.

3. The facility according to claim 2, wherein the one or more suction nozzles are arranged in the particle transfer channel, in proximity of the end of the particle transfer channel.

4. The facility according to claim 1, wherein the transfer zone has a region where the particles orient before the particles enter into the particle transfer channel.

5. The facility according to claim 4, wherein the region allows orientation of the particles based on physical chemical properties of the particles.

6. The facility according to claim 1, wherein a bottom of the particle transfer channel includes a coating of hydrophilic material, interrupted before the end of the particle transfer channel, which is made of hydrophobic material.

7. The facility according to claim 1, wherein the ratio of the first and second widths is between 2000 and 2, or between 100 and 10.

8. The facility according to claim 1, wherein a platen, which comprises a tilted ramp for circulating the particles, is attached to the inlet of the transfer zone, and whereon the carrier liquid is also to circulate.

9. The facility according to claim 1, wherein the deposit head is configured to allow the deposition, onto the substrate, of the film of ordered particles escaping from the end of the particle transfer channel, using a direct contact provided between the end of the deposit head and the substrate.

10. A method for depositing a film of ordered particles onto a substrate, or a moving substrate, using a facility according to claim 1, wherein the particle transfer channel of the accessory device having a desired width is mounted to the particle outlet of the transfer zone.

* * * * *